(12) United States Patent
Juan

(10) Patent No.: US 8,534,404 B2
(45) Date of Patent: Sep. 17, 2013

(54) AUXILIARY POWER DEVICE OF BICYCLE

(75) Inventor: Chih-Chen Juan, Taichung (TW)

(73) Assignee: Yongmart Manufacturing Co., Ltd., Taichung (TW)

( * ) Notice: Subject to any disclaimer, the term of this patent is extended or adjusted under 35 U.S.C. 154(b) by 189 days.

(21) Appl. No.: 13/292,398

(22) Filed: Nov. 9, 2011

(65) Prior Publication Data

US 2012/0055720 A1     Mar. 8, 2012

Related U.S. Application Data

(63) Continuation-in-part of application No. 12/408,208, filed on Mar. 20, 2009, now abandoned.

(51) Int. Cl.
*B60K 6/00* (2007.10)

(52) U.S. Cl.
CPC ........................................ *B60K 6/00* (2013.01)
USPC ............................................ 180/165; 280/215

(58) Field of Classification Search
CPC ................................................... Y02T 10/6208
USPC ............. 180/165, 54.2, 206, 206.1; 280/63, 280/65, 215, 208
See application file for complete search history.

(56) References Cited

U.S. PATENT DOCUMENTS

| | | | | |
|---|---|---|---|---|
| 567,629 A * | 9/1896 | Young | ............................. | 280/215 |
| 688,979 A * | 12/1901 | Wold | ............................. | 280/234 |
| 868,329 A * | 10/1907 | Corbitt | ........................... | 280/215 |
| 1,374,797 A * | 4/1921 | Zaborsky | ....................... | 280/215 |
| 1,707,618 A * | 4/1929 | Keogh | ............................. | 280/223 |
| 1,981,737 A * | 11/1934 | McIlwain | ........................ | 280/223 |
| 2,277,391 A * | 3/1942 | Crumble | ......................... | 280/215 |
| 2,638,359 A * | 5/1953 | Crumble | ......................... | 280/215 |
| 2,908,356 A * | 10/1959 | Daarud | ............................. | 185/39 |
| 2,965,393 A * | 12/1960 | Cauchon | ......................... | 280/212 |
| 4,108,459 A * | 8/1978 | Alvigini | .......................... | 280/215 |
| 4,140,195 A * | 2/1979 | Watanabe et al. | ........... | 180/205.3 |
| 4,263,820 A * | 4/1981 | Wetherald | ...................... | 74/594.2 |
| 4,416,464 A * | 11/1983 | Mattox | ........................... | 280/215 |
| 4,447,068 A * | 5/1984 | Brooks | ........................... | 280/260 |
| 4,533,152 A * | 8/1985 | Clark | .............................. | 280/251 |
| 4,744,577 A * | 5/1988 | Brent et al. | .................... | 280/215 |
| 4,768,607 A * | 9/1988 | Molina | ........................... | 180/165 |
| 5,035,678 A * | 7/1991 | Hageman | ......................... | 474/50 |
| 5,188,003 A * | 2/1993 | Trammell, Jr. | ............... | 74/594.3 |
| 5,301,969 A * | 4/1994 | Bynoe | ............................. | 280/221 |
| 5,429,379 A * | 7/1995 | Grigoriev | ....................... | 280/233 |
| 5,915,493 A * | 6/1999 | Nakayama | .................. | 180/206.4 |
| 6,019,385 A * | 2/2000 | Kelley et al. | ................... | 280/217 |
| 6,035,970 A * | 3/2000 | Conte | .............................. | 185/39 |
| 6,053,830 A * | 4/2000 | Glaeser | ........................... | 474/101 |
| 6,092,821 A * | 7/2000 | Li | .................................. | 280/212 |

(Continued)

*Primary Examiner* — John R Olszewski
*Assistant Examiner* — Jacob Meyer
(74) *Attorney, Agent, or Firm* — Browdy and Neimark, PLLC

(57) ABSTRACT

An auxiliary power device of a bicycle includes a driving member and a base member provided at a first section and a second section of the bicycle respectively. The first section and the second section are two parts of the bicycle, which has a relative motion therebetween in cycling. An input member is provided to the base member to be driven by the driving member when the first section moves relative to the second section. The input member turns a power storage member to store a power. A control member is provided for manipulation to release the power stored in the power storage member for moving the bicycle forward.

15 Claims, 8 Drawing Sheets

(56) References Cited

U.S. PATENT DOCUMENTS

| | | | |
|---|---|---|---|
| 6,139,036 A * | 10/2000 | Ueng | 280/212 |
| 6,173,801 B1 * | 1/2001 | Kakutani et al. | 180/220 |
| RE37,583 E * | 3/2002 | Mayer et al. | 180/220 |
| 6,364,044 B1 * | 4/2002 | Juan | 180/206.2 |
| 6,371,501 B2 * | 4/2002 | Jenkins | 280/216 |
| 6,487,936 B1 * | 12/2002 | Wu et al. | 74/665 B |
| 6,502,842 B2 * | 1/2003 | Ko | 280/215 |
| 6,557,877 B2 * | 5/2003 | Dunkley | 280/215 |
| 6,869,384 B2 * | 3/2005 | Shui | 482/57 |
| 7,240,586 B2 * | 7/2007 | Wu | 74/594.1 |
| 7,370,720 B2 * | 5/2008 | Kokatsu et al. | 180/206.4 |
| 7,673,893 B2 * | 3/2010 | Jan et al. | 280/215 |
| 7,717,448 B2 * | 5/2010 | Clemons et al. | 280/258 |
| 8,100,424 B2 * | 1/2012 | Jan | 280/212 |
| 8,245,599 B2 * | 8/2012 | Juan | 74/665 B |
| 8,251,389 B2 * | 8/2012 | Juan | 280/212 |
| 2005/0077096 A1 * | 4/2005 | Kokatsu et al. | 180/205 |
| 2005/0189157 A1 * | 9/2005 | Hays et al. | 180/207 |
| 2010/0109280 A1 * | 5/2010 | Wills | 280/214 |
| 2010/0148465 A1 * | 6/2010 | Coghill, Jr. | 280/214 |
| 2010/0219006 A1 * | 9/2010 | Juan | 180/54.2 |
| 2011/0186372 A1 * | 8/2011 | Juan | 180/205.1 |
| 2011/0214531 A1 * | 9/2011 | Juan | 74/665 A |

\* cited by examiner

AUXILIARY POWER DEVICE OF BICYCLE

CROSS REFERENCE TO RELATED APPLICATIONS

The present application is a continuation-in-part of U.S. patent application Ser. No. 12/408,208 entitled AUXILIARY POWER DEVICE OF BICYCLE filed on Mar. 20, 2009, now abandoned the disclosure of which is incorporated herein by reference.

BACKGROUND OF THE INVENTION

1. Field of the Invention

The present invention relates generally to a bicycle, and more particularly to an auxiliary power device of a bicycle.

2. Description of the Related Art

In early time, bicycles are nothing but a cheap transportation. In present days, automobiles and motorcycles replace bicycles to be the main transportation means. For a rising of health and recycling issues, however, bicycles become a tool for body fitness and exercise. When petroleum prince rose sharply in 2007 to 2008, riding bicycles further have a meaning of saving power. Until now, more and more people cycle for work or for exercise in holidays.

Typically, the bicycles are equipped with a transmission to meet various roadways. However, cycling in mountain roads or cycling for a long distance still is a heavy loading for riders. There are electric power bicycles in the market which equipped with a battery and a motor that the rider may switch manually for cycling by feet or by motor. However, the battery and the motor are heavy and huge, and the battery power is limited that only elder people choose the electric power bicycles.

SUMMARY OF THE INVENTION

The primary objective of the present invention is to provide an auxiliary power device of a bicycle, which may store power in a normal cycling and release the power in necessary to drive the bicycle forward.

According to the objective of the present invention, a bicycle, which is mounted with an auxiliary power device, has a first section and a second section moving relative to the first section in cycling. The auxiliary power device includes a driving member provided to the first section of the bicycle; a base member provided to the second section of the bicycle; an input member provided to the base member and engaged with the driving member that the driving member drives the input member when the first section moves relative to the second section; a power storage member connected to the input member that the power storage member is driven by the input member to store a power therein; and an output member connected to the power storage member that the power storage member release that power to drive the output member and the output member transfers the power to the bicycle for moving the bicycle.

DETAILED DESCRIPTION OF THE INVENTION

Figure 1:
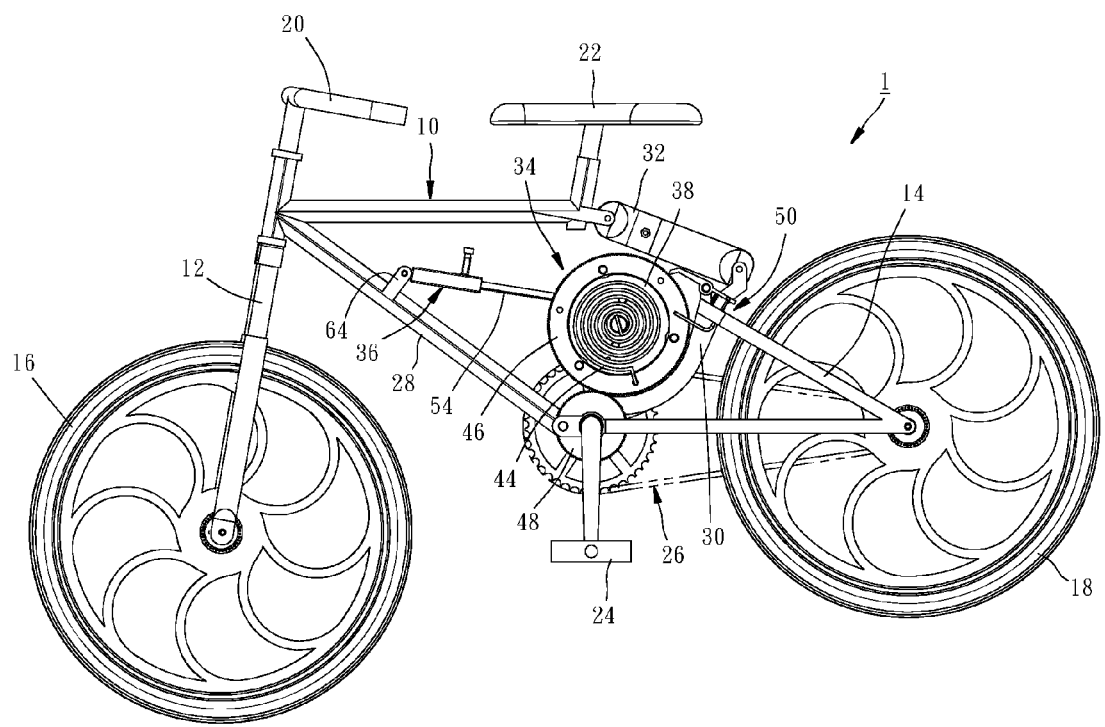
FIG. 1 is a front view of a preferred embodiment of the present invention.

As shown in FIG. 1, a bicycle 1 of the first preferred embodiment of the present invention includes a frame 10 having a front fork 12, a rear fork 14, and two wheels 16, 18 pivoted on the front fork 12 and the rear fork 14 respectively. The frame 10 further includes a handle bar 20 connecting the front fork 12, a seat 22, a crank 24, and a transmission assembly 26 including a front gear set connecting the crank 24, a rear gear set on the rear wheel 18, and a chain connecting the front gear set and the rear gear set. The aforesaid elements are as same as the conventional bicycle, so we do not describe the detail here.

The frame 10 includes a first section 28 and a second section 30. A cushion 32 is provided between the first section 28 and the second section 30 that the first section 28 and the second section 30 will have a relative motion therebetween in cycling. The present invention uses such relative motion between the first section 28 and the second section 30 to generate a power.

Figure 2:
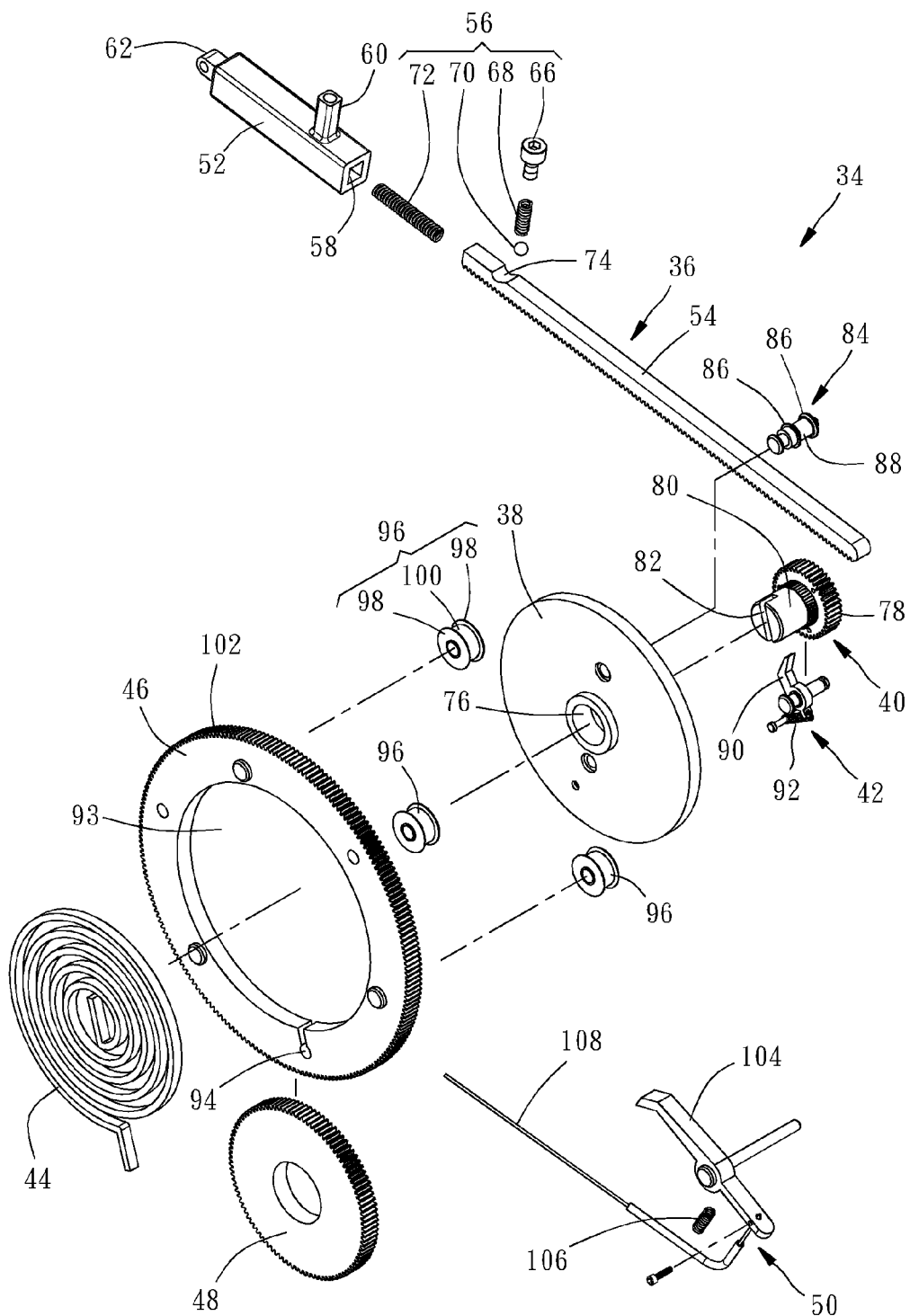
FIG. 2 is an exploded view of the preferred embodiment of the present invention.
Figure 3:
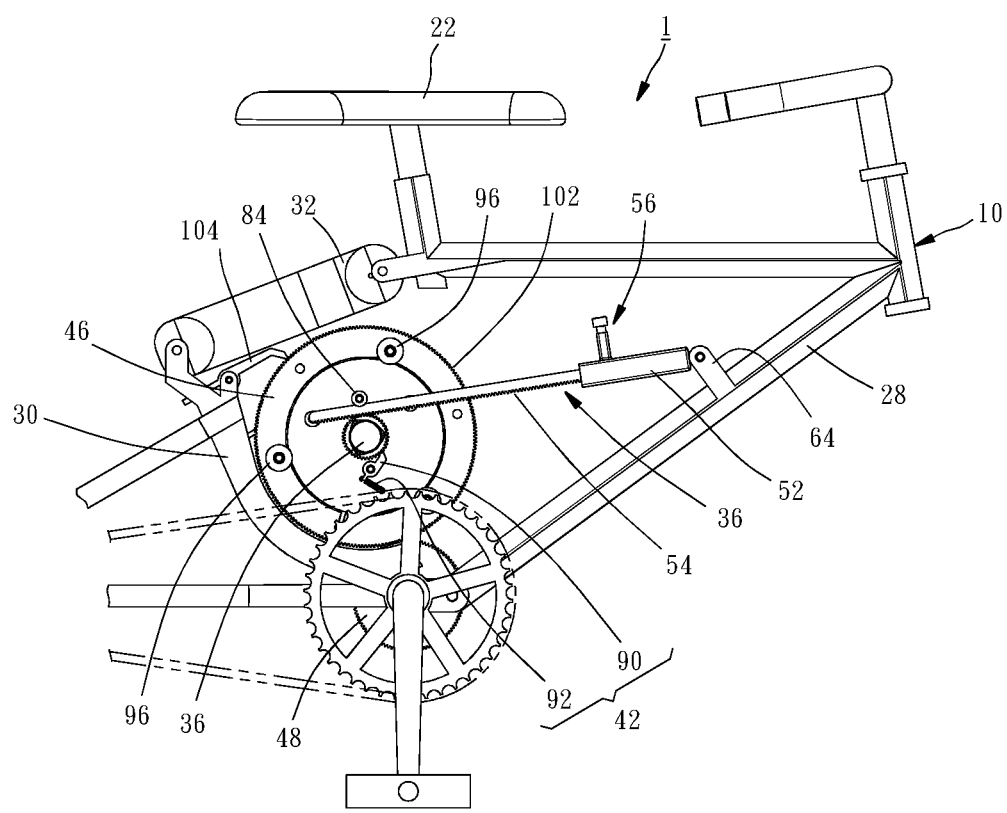
FIG. 3 is a back view of a part of the preferred embodiment of the present invention.

As shown in FIG. 2, an auxiliary power device 34 of the first preferred embodiment of the present invention includes a driving member 36, a base member 38, an input member 40, a ratchet member 42, a power storage member 44, an output member 46, a transmission member 42, and a control member 50.

Figure 4:
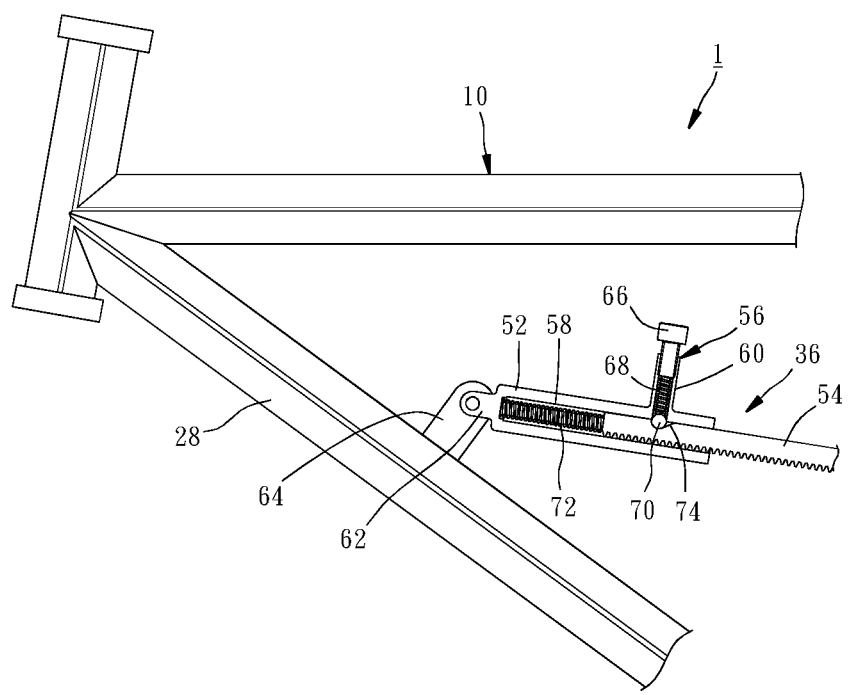
FIG. 4 is a sectional view of the driving member of the preferred embodiment of the present invention.
Figure 5:
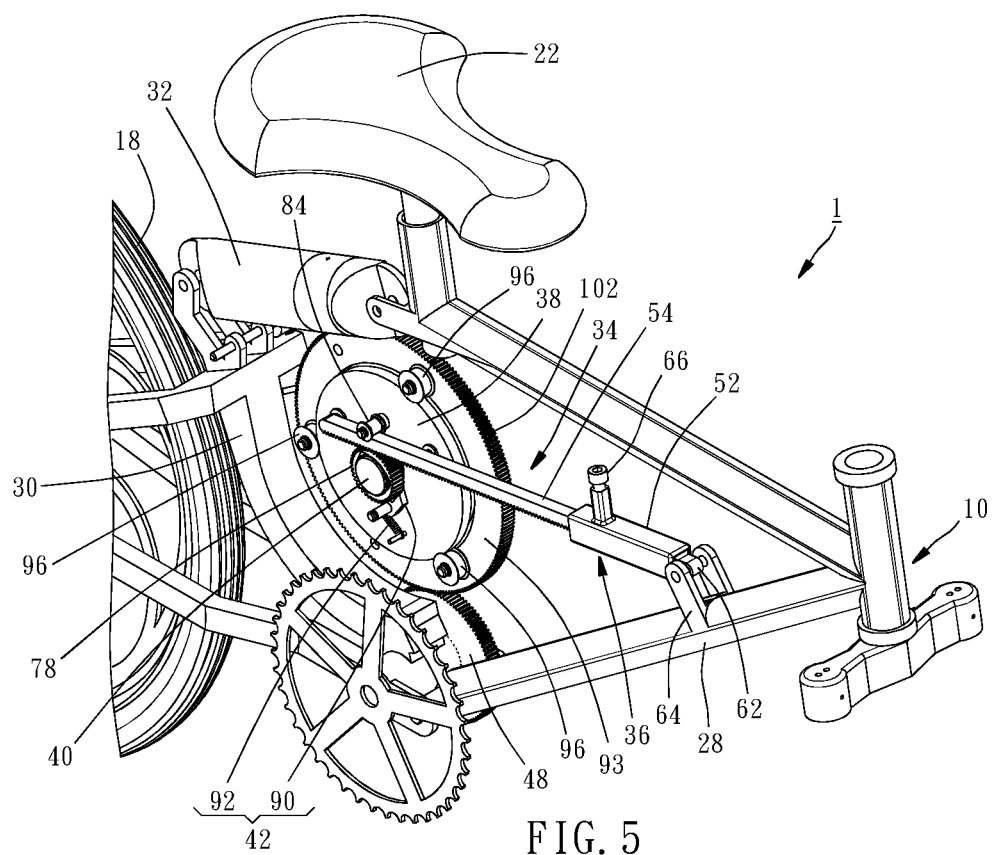
FIG. 5 is a perspective view of a part of the preferred embodiment of the present invention.
Figure 6:
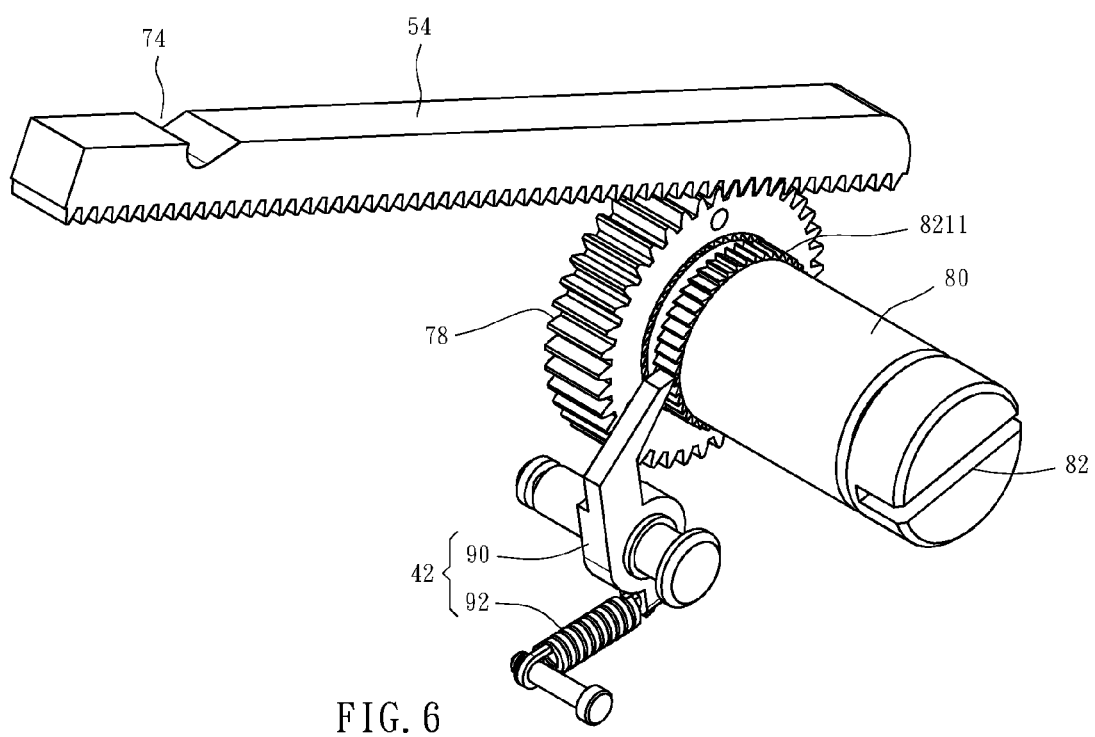
FIG. 6 is an expansion view of a part of a preferred embodiment of the present invention.
Figure 7:
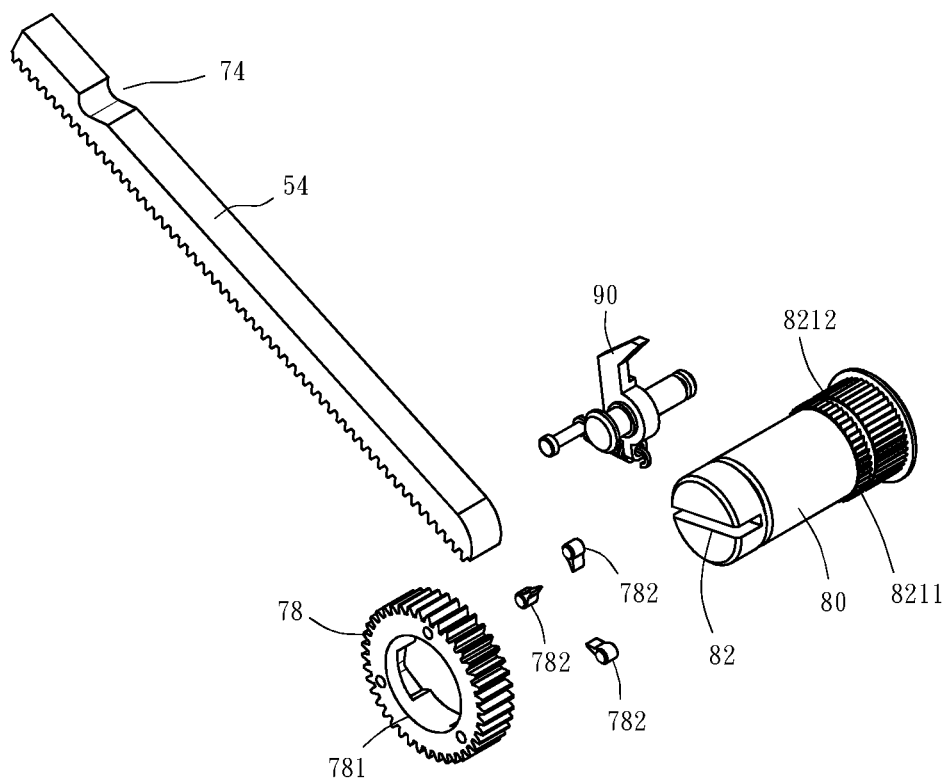
FIG. 7 is an exploded view of a part of a preferred embodiment of the present invention.
Figure 8:
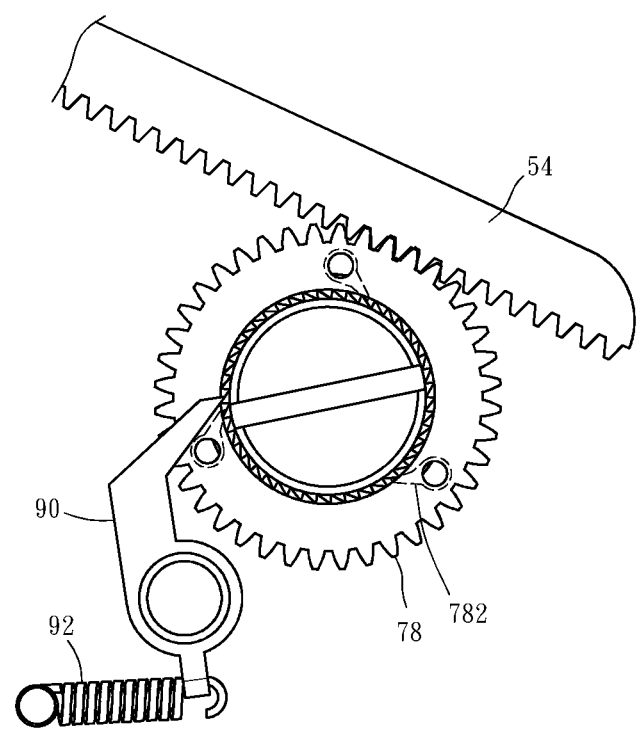
FIG. 8 is a back view of a part of a preferred embodiment of the present invention.

As shown in FIG. 2 to FIG. 5, the driving member 36 includes a base 52, a rack bar 54, and a torque control assembly 56. The base 52 has a hole 58 opening at a front end thereof, a tube 60 on a top thereof communicated with the hole 58, and a pivot portion 62 at a rear end thereof. The pivot portion 62 of the base 52 is pivoted on a pivot portion 64 on the first section 28 of the frame 10. An end of the rack bar 54 is inserted into the hole 58 of the base 52. The torque control assembly 56 includes a bolt 66, a spring 68 and a ball received in the tube 60 of the base 52, a spring received in the hole 58 of the base 52 urging the rack bar 54, and a recess 74 on the rack bar 54. The spring 68 urges the ball 70 in the recess 74 of the rack bar 54, and the bolt 66 may adjust the pressure of the ball 70 pressing the rack bar 54, as shown in FIG. 4.

The base member 38 is a disk-like member fixed to the second section 30 of the frame 10. The base member 38 has a bore 76 at a center thereof. The input member 40 has a gear 78 and a post 80 with a slot 82 on a distal end thereof. There are two gears 8211 8212 on the other end of the post 80. The post 80 passes through the bore 76 of the base member 38 that the gear 78 and the slot 82 are at opposite sides of the base member 38. The gear 78 provides a through hole 781 and a plurality of paws 782 is provided around the inner wall of the through hole 781. These paws 782 are engaged with the second gear 8212 of the post 80. By this way, the gear 78 can push the post 80 to rotate in one direction. The rack bar 54 is meshed with the gear 78 of the input member 40 that a displacement of the rack bar 54 may turn the input member 40. The base member 38 is pivoted with a guiding member 84, which has two walls 84 at opposite ends and a slot 88 between the walls 84. A distance between the walls 84 is slightly greater than a thickness of the rack bar 54 that guiding member 84 hold a back side, the side opposite the teeth, of the rack bar 54 in the slot 88 to keep the rack bar 54 in a smooth reciprocation motion. The ratchet member 42 includes a paw 90 and a spring 92 urging the paw 90 toward the gear 8211 that the paw 90 is normally engaged with the gear 8211 of the post 80 to limit the post 80 only turning in a predetermined direction.

The power storage member 44 is a torsional spring having an end engaged with the slot 82 of the input member 40 and an opposite end connected to the output member 46. The output member 46 is a disk-like member with an opening 93 at a center thereof. The power storage member 44 is received in the opening 93 of the output member 46 and has the opposite end engaged with a slot 94 on an edge of the opening 93. The output member 46 has teeth 102 on a circumference thereof. Three guiding members 96 are pivoted on the output member 46, each of which has two walls 98 on opposite ends and a slot 100 between the walls 98. The guiding members 96 hold a circumference of the base member 38 in the slots 100 respectively that the output member 46 may rotate smoothly relative to the base member 38. The transmission member 48 is a gear connected to an axle of the crank 24. The transmission member 48 is meshed with the teeth 102 of the output member 46.

The control member 50 includes a paw 104, a spring 106, and a wire 108. The spring 106 urges the paw 104 toward the teeth 102 of the output member 46 that the paw 104 is normally engaged with the output member 46 to stop the output member 46 from rotation. The wire 108 has an end connected to the paw 104, and the other end connected to a controller (not shown) on the handle bar 20 that a rider may operate the controller to disengage the paw 104 with the output member 46 to allow the output member 46 for free rotation.

In cycling of the bicycle 1 of the first embodiment of the present invention, a relative motion is occurred between the first section 28 and the second section 30 because of the rough road or other reasons that the rack bar 54 of the driving member 36 reciprocates relative to the input member 40 to drive the input member 40 rotating in a predetermined direction because of the ratchet member 42. The input member 40 will turn the power storage member 44 and those paws 782, and the power storage member 44 stores a torsional power because the output member 46 is stopped by the control member 50.

While the power storage member 44 is turned to a specific degree that the power storage member 44 will generate a reactive force greater than the pressure of the torsion control member 56 exerting the rack bar 54, the ball 70 will leave the recess 74 on the rack bar 54 and the rack bar 54 is free to move relative to the base 52 that the rack bar 54 will no longer drive the input member 40 turning. This may protect the power storage member 44 from over turning.

When a rider operates the controller to disengage the paw 104 with the output member 46, the power storage member 44 will release the stored power to turn the output member 46 for rotation that the output member 46 may drive the bicycle 1 moving forward via the transmission member 48.

In conclusion, the present invention uses the lost power in cycling and transfers it to a controllable power to move the bicycle forward that it may provide the rider an extra auxiliary power when he/she has a heavier loading in cycling.

What is claimed is:

1. An auxiliary power device of a bicycle, wherein the bicycle has a first frame section and a second frame section moving relative to the first section in cycling, the auxiliary power device comprising:

a driving member provided to the first frame section of the bicycle;

a base member provided to the second frame section of the bicycle;

an input member provided to the base member and engaged with the driving member so that the driving member drives the input member when the first frame section moves relative to the second frame section, the input member includes an input gear and a post comprising a slot and a first post gear and a second post gear on the end of the post opposite the slot, the post passes through the bore of the base member so that the input gear and the slot are at opposite sides of the base member, the gear provides a through hole and a plurality of paws are provided around the inner wall of the through hole, these paws are engaged with the second post gear, by this way the gear can push the post to rotate in one direction;

a ratchet member limiting the input member only turning in a predetermined direction;

a power storage member connected to the input member so that the power storage member is driven by the input member to store a power therein; and an output member connected to the power storage member so that the power storage member releases that power to drive the output member and the output member transfers the power to the bicycle for moving the bicycle.

2. The auxiliary power device of the bicycle as defined in claim 1, wherein the driving member has a rack bar, and the input gear meshed with the rack bar.

3. The auxiliary power device of the bicycle as defined in claim 1, wherein the driving member further has a torque control assembly including a base having a hole receiving an end of the rack bar therein, a bolt, a spring, and a ball installed in the base in sequence so that the spring urges the ball pressing the rack bar and the bolt adjusts a pressure of the spring urging the ball.

4. The auxiliary power device of the bicycle as defined in claim 3, wherein the torque control assembly further includes a spring received in the hole of the base urging the rack bar.

5. The auxiliary power device of the bicycle as defined in claim 3, wherein the rack bar has a recess receiving the ball therein.

6. The auxiliary power device of the bicycle as defined in claim 1, wherein the ratchet member includes a paw and a spring urging the paw normally engaging the first post gear.

7. The auxiliary power device of the bicycle as defined in claim 1, wherein the output member has an opening receiving the power storage member therein.

8. The auxiliary power device of the bicycle as defined in claim 2, further comprising a guiding member between the base member and the rack bar of the driving member.

9. The auxiliary power device of the bicycle as defined in claim 8, wherein the guiding member, which is pivoted on the base member, has two walls on opposite ends, and a slot between the walls to receive an edge of the rack bar of the driving member therein.

10. The auxiliary power device of the bicycle as defined in claim 1, further comprising a guiding member between the base member and the output member.

11. The auxiliary power device of the bicycle as defined in claim 10, wherein the guiding member, which is pivoted on the output member, has two walls on opposite ends, and a slot between the walls to receive an edge of the base member therein.

12. The auxiliary power device of the bicycle as defined in claim 1, further comprising a transmission member connected to the output member to transfer the power to a wheel of the bicycle.

13. The auxiliary power device of the bicycle as defined in claim 1, further comprising a control member for manipulation to fix the output member for no rotation or to release the output member for free rotation, wherein the control member fixes the output member for no rotation.

14. The auxiliary power device of the bicycle as defined in claim 13, wherein the control member includes a paw, a spring urging the paw engaging teeth of the output member, and a wire connected to the paw to move the paw for disengaging the output member.

15. The auxiliary power device of the bicycle as defined in claim 1, wherein the bicycle has a frame mounted with a cushion so that the first frame section and the second frame section are located on opposite sides of the cushion.

\* \* \* \* \*